US005969291A

United States Patent [19]

Bertazzi et al.

[11] Patent Number: 5,969,291

[45] Date of Patent: Oct. 19, 1999

[54] OVERHEAD-LINE MAST WITH INSULATED MAST HEAD

[75] Inventors: Arnaldo Bertazzi, Monza, Italy; Helmut Böhme, Nussloch, Germany; Johannes Kaumanns, Hürth, Germany; Karl-Bernhard Müller, Schwetzingen, Germany; Gernot Schlayer, Mannheim, Germany; Andrea Catenacci, Milan, Italy

[73] Assignee: ABB Research LTD, Zurich, Switzerland

[21] Appl. No.: 09/010,171

[22] Filed: Jan. 21, 1998

[30] Foreign Application Priority Data

Jan. 21, 1997 [DE] Germany ........................... 197 01 828

[51] Int. Cl.[6] ............................ E04H 12/00; H02G 7/00; H02G 7/05

[52] U.S. Cl. .................................... 174/45 R; 174/45 TD; 174/40 R; 174/163 F

[58] Field of Search ............................ 174/45 R, 45 TD, 174/40 R, 43, 44, 40 TD, 163 R, 163 F

[56] References Cited

U.S. PATENT DOCUMENTS 3,531,578 9/1970 Dey .......................................... 174/43
4,803,819 2/1989 Kelsey .................................. 52/309.1
5,175,442 12/1992 Ashley ..................................... 307/91
5,335,160 8/1994 Savoca ................................... 362/431

*Primary Examiner*—Kristine Kincaid
*Assistant Examiner*—Mark Olds
*Attorney, Agent, or Firm*—Herbert L. Lerner; Laurence A. Greenberg

[57] ABSTRACT

An overhead-line mast includes a bar-shaped and insulated mast head, current-carrying conductors fastened to insulators of the insulated mast head and a ground conductor disposed on a mast tip of the insulated mast head. The ground conductor is connected electrically to a neutral point on a mast base by a ground conductor connection extending in the interior of the overhead-line mast. The ground conductor connection is sheathed by an insulating layer. The insulating layer is covered in each case by an insulating cone at the level of the current-carrying conductors. An annular electrode extends in or on each insulating cone. An insulating filler is inserted between the insulating layer and the insulating cones on one hand and the insulators of the insulated mast head on the other hand.

9 Claims, 1 Drawing Sheet

OVERHEAD-LINE MAST WITH INSULATED MAST HEAD

BACKGROUND OF THE INVENTION

Field of the Invention

The invention relates to an overhead-line mast with a bar-shaped and insulated mast head, current-carrying conductors fastened to insulators of the insulated mast head, and a ground conductor disposed on a mast tip of the insulated mast head.

The invention can be used, for example, in three-phase overhead lines, but is also suitable for any other type of current (direct current, single-phase current, polyphase currents other than three-phase current).

An overhead-line mast in the form of a straight bar that is made of steel, for example, is clamped at one end in a foundation and includes an upper part which has an insulated construction (insulated mast head) and supports the phase conductors or, in general, the current-carrying conductors as well as the ground conductor (bar-type mast) on the mast tip. Such a structure has large advantages because of the extremely simple shape, the very small width of right of way and the conductor configuration, which is very well suited for minimizing the electric and magnetic field in the vicinity of the surface of the ground.

In order to realize such an overhead-line concept or mast concept, the ground conductor must be guided from the mast tip to the ground. For reasons of insulation, guiding an overhead ground wire outside the mast in air requires appropriately large spacings from the current-carrying conductors, with the result being that the advantages of the very simple mast concept with the smallest widths of right of way do not come to bear.

SUMMARY OF THE INVENTION

It is accordingly an object of the invention to provide an overhead-line mist with an insulated mast head, which overcomes the hereinafore-mentioned disadvantages of the heretofore-known devices of this general type and which requires only a very small width of right of way despite guiding an overhead ground wire from a ground conductor on a mast tip to the ground.

With the foregoing and other objects in view there is provided, in accordance with the invention, an overhead-line mast, comprising a bar-shaped and insulated mast head having insulators and a mast tip; current-carrying conductors fastened to the insulators at given levels; a ground conductor disposed on the mast tip; a mast base having a neutral point; a ground conductor connection extending in the interior of the overhead-line mast and electrically connecting the ground conductor to the neutral point; an insulating layer covering the ground conductor connection; insulating cones each covering the insulating layer at a respective one of the given levels; annular electrodes each extended on or in a respective one of the insulating cones; and an insulating filler introduced between the insulating layer and the insulators as well as between the insulating cones and the insulators.

In accordance with another feature of the invention, the insulating layer is formed of polyethylene.

In accordance with a further feature of the invention, the insulating cones are formed of silicone rubber.

In accordance with a concomitant feature of the invention, the filler is formed of an insulating foam plastic or an insulating casting compound or an insulating liquid or an insulating gas.

The advantages which can be achieved with the invention are, in particular, that because of the guidance of the ground conductor connection in the interior of the mast, a bar mast is created which has the advantages of the simplest shape, the smallest width of right of way and the conductor configuration which is very favorable for minimizing the electric and magnetic field in the vicinity of the surface of the ground, despite the guidance of an overhead ground wire from the ground conductor on the mast tip to the ground. The measures proposed reliably ensure that, despite the small insulating clearances present in the interior of the mast between the overhead ground wire connection and the current-carrying conductors, no sparkovers, in particular long-term sparkovers, occur in the radial direction inside the mast, nor do any sparkovers occur along the boundary layer of the mast insulation, either in the case of overvoltages or in the case of the operating voltage, nor does any impermissible corona occur at the operating voltage.

Other features which are considered as characteristic for the invention are set forth in the appended claims.

Although the invention is illustrated and described herein as embodied in an overhead-line mast with an insulated mast head, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
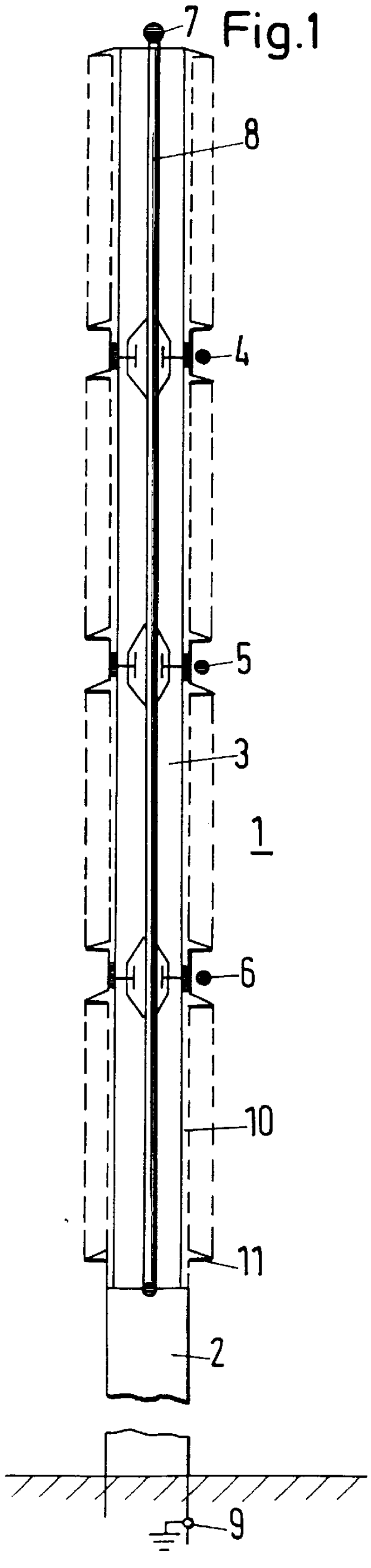
FIG. 1 is a fragmentary, diagrammatic, elevational view of an overhead-line mast which is constructed according to the invention, with a ground conductor connection extending inside the overhead-line mast.

Referring now to the figures of the drawings in detail and first, particularly, to FIG. 1 thereof, there is seen an overhead-line mast which is constructed according to the invention. The overhead-line mast 1 essentially includes a bar 2 which is made from steel, for example, and is clamped in a foundation, as well as an insulated mast head 3. Current-carrying and voltage-carrying conductors, for example phase conductors 4, 5, 6 of a three-phase system, are fastened to the insulated mast head 3, and a ground conductor 7 is fastened to a mast tip. An electric connection between the ground conductor 7 and a neutral point 9 on a mast base is performed inside the overhead-line mast 1 through a ground conductor connection 8.

An electric insulation of the individual phase conductors 4, 5, 6 from one another and with respect to the ground conductor 7 is performed by insulators 10. The insulators 10 are provided in a known way with screens or sheds 11, in order to increase creepage distances.

Figure 2:
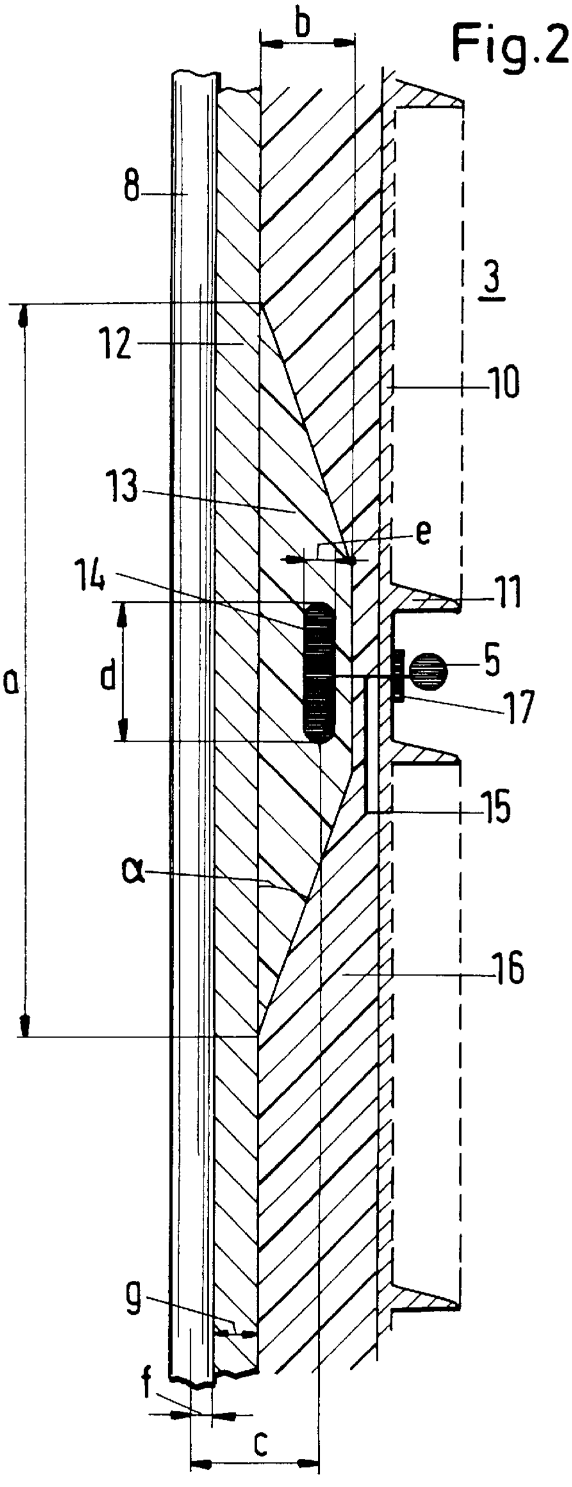
FIG. 2 is an enlarged, fragmentary, longitudinal-sectional view of the insulated mast head which is presented for the purpose of explaining the structure thereof.

FIG. 2 shows an enlarged section, for the purpose of explaining the construction of the insulated mast head. For example, it is possible to see the structure in the immediate surroundings of the phase conductor 5, and the same structure also occurs in the immediate surroundings of the further phase conductors 4 and 6. The ground conductor connection 8 is sheathed by an insulating layer 12, which is preferably made from polyethylene (PE/VPE) and is applied by using an extrusion method. The radius of the ground conductor connection 8 is indicated by reference symbol f, and the thickness of the insulating layer 12 is indicated by reference symbol g.

In the region (or at the level) of the phase conductors, elastic insulating cones 13, which are preferably made from silicone rubber, are pushed onto the ground conductor connection 8 sheathed by the insulating layer 12. A cylindrical outer surface of the insulating cones 13 is smaller than a cylindrical inner surface thereof. The length of such an insulating cone 13 is indicated by reference symbol a, its thickness is indicated by reference symbol b and its inclination is indicated by reference symbol $\alpha$.

An annular electrode 14 is located on the cylindrical outer surface of an insulating cone 13, or in the vicinity of that outer surface inside the insulating cone. The annular electrode 14 is made from an electrically conductive material and is connected in an electrically conductive manner to the assigned phase conductor, that is to the phase conductor 5 in the exemplary embodiment, through a connecting conductor 15, and carries the potential thereof. The radius of the annular electrode 14 is indicated by reference symbol c, its length is indicated by reference symbol d and its thickness is indicated by reference symbol e.

An electrically insulating filler 16, which is preferably an insulating foam plastic and/or an insulating casting compound and/or an insulating liquid and/or an insulating gas, is inserted into a free space between the insulating layer 12 and the insulators 10. The phase conductor 5 is fastened to the insulated mast head 3 by a flange 17 which is connected to the insulators 10, for example.

The length a of the insulating cone 13, the thickness b of the insulating cone, the inclination $\alpha$ of the insulating cone, the radius c of the annular electrode 14, the length d of the electrode, the thickness e of the electrode, the radius f of the ground conductor connection 8, the thickness g of the insulating layer 12, and the relative permittivity of the insulating materials that are employed (the insulating layer 12, the insulating cone 13, the insulating filler 16, the insulators 10) are matched to one another in such a way that loading due to the electric field strength does not exceed the respective electric strength in any region. The field strengths are preferably high in the insulating layer 12 and in the insulating cone 13, as is the electric strength for these parts.

The annular electrode 14 which is disposed on or in the insulating cone 13 serves the purpose of field control in the interior of the insulating cone 13 and the insulating layer 12 and at an interface between the insulating cone and the filler 16, and produces an acceptable field strength at the interface between the insulating cone 13 and the insulating filler 16, and thus an acceptable field strength in the filler. The electrode 14 further has the effect of shielding the phase conductor and the flange 17 in air, as a result of which the surface field strength at the flange and at the phase conductor in air is limited to permissible values below a corona inception.

In general terms, the dimensions and parameters which are set forth in detail above are to be selected in such a way that the electric field strengths occurring at the mast head are lower under all operating conditions than the sparkover field strengths that are valid for the selected insulating materials and the respective cases of loading, in order to prevent sparkovers inside the mast, or the limiting field strengths which are found to be valid by experience, in order to prevent sparkovers along the interface between the mast insulation and the air. Of course, the calculations also include overvoltages produced by switching operations and/or lightning effects. Furthermore, it is not permissible for the operating voltage at the surface of the phase conductors and of the required fastening elements (flanges 17) to lead to field strengths that are so high that a corona occurs which causes both disadvantageous losses and noise. Furthermore, the operating voltage between the ground conductor and the current-carrying conductor must be held permanently at reliable values inside the insulated mast head, in order to reliably prevent long-term sparkover in the radial direction.

In addition to the application explained above in the case of a three-phase system, the invention can also be used in the case of direct current, single-phase current and other polyphase currents.

We claim:

1. An overhead-line mast, comprising:

a bar-shaped and insulated mast head having insulators and a mast tip;

current-carrying conductors fastened to said insulators at given levels;

a ground conductor disposed on said mast tip;

a mast base having a neutral point;

a ground conductor connection extended in the interior of the overhead-line mast and electrically connecting said ground conductor to said neutral point;

an insulating layer covering said ground conductor connection;

insulating cones each covering said insulating layer at a respective one of said given levels;

annular electrodes each extended at a respective one of said insulating cones; and an insulating filler introduced between said insulating layer and said insulators as well as between said insulating cones and said insulators.

2. The overhead-line mast according to claim 1, wherein said insulating layer is formed of polyethylene.

3. The overhead-line mast according to claim 1, wherein said insulating cones are formed of silicone rubber.

4. The overhead-line mast according to claim 1, wherein said filler is formed of an insulating foam plastic.

5. The overhead-line mast according to claim 1, wherein said filler is formed of an insulating casting compound.

6. The overhead-line mast according to claim 1, wherein said filler is formed of an insulating liquid.

7. The overhead-line mast according to claim 1, wherein said filler is formed of an insulating gas.

8. The overhead-line mast according to claim 1, wherein said annular electrodes are each extended in a respective one of said insulating cones.

9. The overhead-line mast according to claim 1, wherein said annular electrodes are each extended on a respective one of said insulating cones.

* * * * *